United States Patent
Maziers et al.

(10) Patent No.: US 9,849,612 B2
(45) Date of Patent: Dec. 26, 2017

(54) MANUFACTURE OF POLYLACTIDE-BASED ARTICLES BY ROTATIONAL MOLDING

(75) Inventors: Eric Maziers, Seneffe (BE); Thierry Coupin, Carnières (BE)

(73) Assignee: Futerro S.A., Escanaffles (BE)

( * ) Notice: Subject to any disclaimer, the term of this patent is extended or adjusted under 35 U.S.C. 154(b) by 664 days.

(21) Appl. No.: 13/877,240

(22) PCT Filed: Oct. 5, 2011

(86) PCT No.: PCT/EP2011/067354
§ 371 (c)(1),
(2), (4) Date: Jun. 11, 2013

(87) PCT Pub. No.: WO2012/045759
PCT Pub. Date: Apr. 12, 2012

(65) Prior Publication Data
US 2013/0253166 A1  Sep. 26, 2013

(30) Foreign Application Priority Data
Oct. 5, 2010  (BE) .................................. 2010/0584

(51) Int. Cl.
*B29C 41/04* (2006.01)
*C08G 63/08* (2006.01)
*B29C 41/00* (2006.01)
*B29C 41/46* (2006.01)
*B29K 33/04* (2006.01)

(52) U.S. Cl.
CPC .......... *B29C 41/042* (2013.01); *B29C 41/003* (2013.01); *B29C 41/04* (2013.01); *B29C 41/46* (2013.01); *C08G 63/08* (2013.01); *B29K 2033/04* (2013.01)

(58) Field of Classification Search
USPC .......................................... 528/354; 264/311
See application file for complete search history.

(56) References Cited

U.S. PATENT DOCUMENTS

| | | | |
|---|---|---|---|
| 5,053,485 A | 10/1991 | Nieuwenhuis et al. | |
| 5,053,522 A | 10/1991 | Muller | |
| 5,117,008 A | 5/1992 | Bhatia et al. | |
| 2006/0014975 A1 | 1/2006 | Coszach et al. | |
| 2009/0246544 A1* | 10/2009 | Narita et al. | 428/480 |
| 2010/0227963 A1 | 9/2010 | Hironaka et al. | |
| 2011/0319588 A1 | 12/2011 | Coupin et al. | |

FOREIGN PATENT DOCUMENTS

| | | |
|---|---|---|
| EP | 2042554 A1 | 4/2009 |
| KR | 2009-0024713 | 3/2009 |

OTHER PUBLICATIONS

Peacock (Polymer Chemistry Properties and Applications Chapter 15 Rotational Molding, p. 243-251, 2006).*
Drobny (Handbook of Thermoplastic Elastomers Chapter 4.8 Rotational Molding p. 115, 2007).*
Callari et al. (Small Pellets Pack a Big Processing Punch, Plastics World, p. 20-22, Nov. 1994).*
Barrett J: "Quality Breakthrough for Rotational Moulding", Eureka, Findlay Publications Ltd., vol. 11, No. 7, Dartford, GB, 1991, p. 27-28.
J.R. Sarasua et al., "Crystallinity and Mechanical Properties of Optically Pure Polylactides and Their Blends", Polymer Engineering and Science, May 2005, vol. 45, Issue 5, pp. 745-753.
Office Action issued in Korean Patent Application No. 2013-7008807, dated Jan. 28, 2015 (12 pages).

* cited by examiner

*Primary Examiner* — Christopher M Rodd
(74) *Attorney, Agent, or Firm* — Adolph Locklar

(57) ABSTRACT

The present invention relates to a method for manufacturing polylactide-based articles by rotational molding and also to the articles obtained by the method.

5 Claims, 1 Drawing Sheet

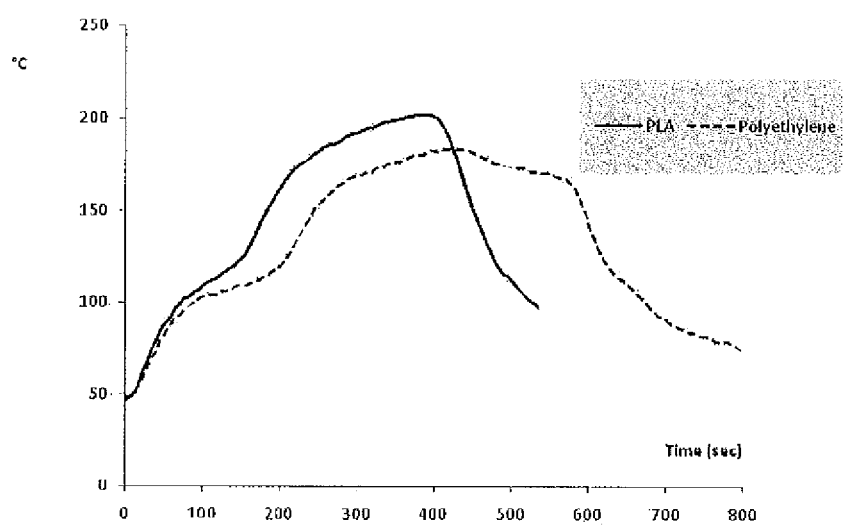

MANUFACTURE OF POLYLACTIDE-BASED ARTICLES BY ROTATIONAL MOLDING

CROSS-REFERENCE TO RELATED APPLICATIONS

This application claims the benefit of PCT/EP2011/067354, filed Oct. 5, 2011, which claims priority from BE 2010/0584, filed Oct. 5, 2010.

The present invention relates to a process for the manufacture of articles made of polylactide (PLA) by rotational molding and to the articles produced by this process.

The rotational molding process has been known for a very long time and makes it possible to prepare hollow plastic articles. This process consists in placing plastic in a mold and setting this mold in rotation, in order for all the points of the internal surface of the mold to be brought into contact with the plastic, and in subsequently heating the assembly while rotating, so as to deposit said molten plastic over the internal surface of the mold. Subsequently, a cooling stage makes it possible to solidify the component, which is subsequently removed from the mold.

Rotational molding is valued as it prevents the induction, in the plastic, of tensions such as those which may be found in injection-molded parts. This is because the plastic is not subjected to as forceful kneading or compacting as in an extruder or in an injection-molding device. Rotational molding makes possible the manufacture of large-size articles, such as tanks and vats.

The most widely used plastic polymer in rotational molding is polyethylene but other polymers, such as polyvinyl chlorides (PVCs), polyamides, polycarbonates and polypropylenes, can also be used. Nevertheless, all these polymers result, on conclusion of the rotational molding process, in the formation of molded objects which exhibit a form having not insignificant shrinkage in comparison with the form of the mold. Moreover, these polymers are characterized either by a very slow coalescence or by a high melting point, which increases the duration of the cycle for production of the rotationally molded objects prepared starting from these. In point of fact, it turns out that one of the more significant criteria for the success of a rotational molding process is the coalescence of the particles of the plastic as, generally, the conduct of the process depends greatly on it.

There thus exists a need to produce articles by rotational molding which satisfy the criterion of rapid coalescence and which make it possible to obtain articles exhibiting a low shrinkage.

The Applicant Company has found, surprisingly, that, by using PLA as base polymer in the rotational molding process, the abovementioned disadvantages can be surmounted. Furthermore, as PLA is a biodegradable polymer, its use is particularly valuable and constitutes an advantage in comparison with the polymers currently used.

The object of the present invention is to provide a rotational molding process for the production of articles exhibiting a low shrinkage.

Another object of the present invention is to provide a rotational molding process for the production of articles exhibiting an evenness in a thickness of the walls.

Another object of the present invention is to provide a rotational molding process for the production of articles exhibiting a good internal and external surface appearance, without any runs, bubbles or other defects.

Another object of the present invention is to provide a rotational molding process for the production of articles with good mechanical properties.

At least one of the abovementioned objects is achieved with the present invention.

BRIEF DESCRIPTION OF DRAWINGS

FIG. 1 is a graph of the temperature of the air in the mold during rotational molding as a function of time as described in Example 6.

DETAILED DESCRIPTION

The invention relates to a process for the manufacture of PLA-based articles by rotational molding, comprising the introduction into the mold of a PLA-based plastic.

The present invention relates to a process for the manufacture of a polylactide-based article by rotational molding, comprising the following stages:
a) placing at least polylactide in a mold,
b) subjecting the polylactide to a rotational molding which comprises heating to a temperature of between 150° C. and 230° C.,
c) cooling the mold and/or the article obtained,
d) removing the article from the mold.

The polylactide used in the process of the invention can be a poly-L-lactide (PLLA), a poly-D-lactide (PDLA) and/or a mixture of PLLA and PDLA. PLLA is understood to mean a polymer in which the majority of the repeat units are L-lactide monomers and PDLA is understood to mean a polymer in which the majority of the repeat units are D-lactide monomers. Preferably, the polylactide used is PLLA or PDLA, more preferably PLLA.

Preferably, in the process of the present invention, PLLA or PDLA respectively has an optical purity, also known as isomeric purity, for L or D of greater than 92% by weight, preferably of greater than 95% by weight, more preferably of greater than or equal to 98% by weight. An optical purity of at least 99% by weight is really preferred.

The PLLA used in the invention thus comprises a content of D mer (monomeric unit of D type) of less than 8% by weight, preferably of less than 5% by weight and more preferably of less than or equal to 1% by weight of PLLA, and the PDLA used comprises a content of L mer unit (monomeric unit of L type) of less than 8% by weight, preferably of less than 5% by weight and more preferably of less than or equal to 1% by weight of PDLA.

The PLA (PLLA or PDLA) preferably has a number-average molecular weight of between 30 000 and 350 000 g/mol, more preferably between 50 000 and 175 000 g/mol and more preferably still between 70 000 and 150 000 g/mol when it is measured by gel permeation chromatography with respect to a polystyrene standard in chloroform at 30° C. The ratio of the weight-average molecular weight (Mw) to the number-average molecular weight (Mn) is generally between 1.2 and 5.0.

The process for production of PLA is well known to a person skilled in the art. The PLA used in the invention can, for example, be obtained by the process described in the documents WO 1998/002480, WO 2010/081887, FR 2 843 390, U.S. Pat. No. 5,053,522, U.S. Pat. No. 5,053,485 or U.S. Pat. No. 5,117,008.

Preferably, the PLA used in the process of the invention is in the form of particles having a size of between 20 μm and 2000 μm. However, although dimensions of the order of 2000 μm are perfectly suitable, use may be made of particles having a size of between 50 and 1000 μm and preferably between 100 and 800 μm. In the present invention, particles is understood to mean grains, in particular having spherical and/or ovoid shapes. The size corresponds to the longest dimension of these particles. In the case of spherical particles, the size corresponds to the diameter of these particles.

The PLA particles can be obtained by the extrusion of the PLA at the outlet of the reactor through a die, the orifices of which have the corresponding dimension. This PLA is defined in the present invention as being provided in the form of "microgranules".

The PLA particles can also be obtained by grinding PLA granules having a dimension of greater than 2000 µm, for example granules having a dimension of between 4000 µm and 5000 µm. Such PLA granules can be obtained after the polymerization stage by extrusion, the PLA being passed through a die having orifices of the corresponding dimension. In this case, the grinding of the PLA granules can be carried out with different types of mills, such as, for example, a disk mill, a hammer mill, a pin mill or an electromagnetic mill, for example a piston mill. The grinding can be carried out at ambient temperature or can be carried out under cryogenic conditions, that is to say that it is carried out at a temperature of between −10 and −200° C., preferably between −20 and −100° C. Cryogenic grinding makes it possible in particular to prevent the yellowing of the articles obtained and to obtain a high throughput of ground powder. Cryogenic grinding also makes it possible to produce a powder not comprising filaments, which is particularly suitable for rotational molding. The grinding can be carried out under an inert atmosphere, that is to say in the absence of oxygen, for example under nitrogen.

After the grinding, it is possible to measure and/or modify the particle size of the PLA by using rotary sieves. Use may be made, in order to determine the particle size of the PLA, of a sieving method, for example using sieves of different mesh sizes, or a laser method. In the present invention, the PLA having a particle size of between 20 µm and 2000 µm which is obtained after the grinding of PLA particles having a dimension greater than 2000 µm is defined as "PLA powder".

The PLA used in the process of the invention can be either in the form of powder, or in the form of microgranules, or in the form of a mixture of powder and microgranules.

The PLA-based powder or microgranules can be used alone, that is to say as is without the addition of other compounds, or as a mixture with various compounds, fillers, agents and/or additives. Numerous methods for mixing the PLA used in the process of the invention with these compounds, fillers, agents and/or additives can be envisaged. Although it is envisaged to produce such mixtures in the molten state, it is also possible to produce the mixture at the level of the powder and microgranules. These can, for example, be added in the mold to the PLA powder and/or microgranules as used in the process of the invention. They can also be mixed with the powder after the grinding or with the microgranules using a mixer before being introduced into the mold. They can also be introduced as a mixture with the PLA in the molten state obtained directly after polymerization. Some of these compounds, fillers, agents and/or additives can be added during the polymerization of the PLA. It is also possible to envisage the addition of these compounds, fillers, agents and/or additives to the PLA granules having a dimension of greater than 2000 µm before the grinding stage. The PLA-based powder and microgranules can thus comprise antioxidants and/or light-, heat- and/or UV-stabilizers.

Mention may be made, by way of example, as antioxidants suitable for the invention, of compounds comprising sterically hindered phenol functional groups in the simple or oligomeric form, such as Irganox® MD1024 from BASF. Use may also be made of antioxidants referred to as "secondary", such as compounds comprising phosphite functional groups, such as Ultranox 626 from Chemtura.

When one of these additives is present, its concentration by weight is between 0.05% and 5%, with respect to the PLA-based powder and/or microgranules.

The PLA-based powder and microgranules can also comprise reinforcing and/or bulking fillers, agents which modify the impact strength, additives or chain-modifying compounds.

The reinforcing and/or bulking fillers are preferably chosen from the group consisting of fibrous fillers, such as glass fibers, metal fibers or carbon fibers, mineral fillers, such as clays, kaolin, or reinforcing nanoparticles, such as carbon nanotubes or nanotubes made of thermosetting material, and fillers made of powder, such as talc.

The agents which modify the impact strength are generally polymers of elastomeric type chosen from biopolyesters (biodegradable polyesters), aliphatic or aromatic copolyesters, such as poly(butylene adipate-co-terephthalate) and poly(butylene succinate-co-adipate), and their mixtures. Mention may be made, as commercialized products which meet this definition and which can be used in the PLA-based powder and/or microgranules, of Ecoflex®, a product sold by BASF, or NP EL 01, sold by NaturePlast. The agents which modify the impact strength, such as styrene/ethylene/butadiene/styrene (SEES) or acrylic elastomers, such as polyacrylic elastomers, can also be used. The impact modifiers can optionally comprise grafted groups, such as maleic anhydride and epoxy, for example. The impact modifiers can also be mixtures of the abovementioned compounds.

The additives can be, for example, flame-retardant agents, lubricants, plasticizers, compounds of use in the catalysis of the synthesis of the polymer matrix, antistatic agents, pigments, dyes, molding aids or surfactants. Use may in particular be made, among plasticizers, of those of the family of the citrates, in particular citrate esters, such as terbutylene citrate (TBC), or butyrate esters, such as triethylene glycol di 2-ethyl hexyl butyrate, or their mixtures. Preferably, TBC is used.

The chain-modifying compounds are generally chosen from copolymers and terpolymers comprising ethylene and an unsaturated monomer carrying at least one epoxide or carboxylic acid or carboxylic anhydride fraction and one (meth)acrylate fraction. It is preferable in particular to use an ethylene, methyl acrylate and glycidyl methacrylate terpolymer. A terpolymer example is Lotader AX8900®, sold by Arkema France.

When one of these additives is present, its concentration by weight is between 0.05% and 100%, with respect to the PLA powder and/or microgranules. For example, 50 g of chain modifier can be added to 50 g of PLA powder, i.e. 100% of chain modifier with respect to the PLA powder.

According to one embodiment, the PLA used in the present invention is used as is, that is to say without the addition of any other compounds to the powder and/or microgranules.

According to another embodiment, the PLA comprises an agent which modifies the impact strength.

According to another embodiment, the PLA comprises an agent which modifies the impact strength and a plasticizer.

According to yet another embodiment, the PLA comprises an agent which modifies the impact strength, a plasticizer and a chain-modifying agent.

According to a specific form of the invention, the PLA-based powder and/or microgranules comprise, based on the weight of these, from 17 to 25% by weight of a chain-modifying compound, from 30 to 55% by weight of an elastomeric polymer and from 20 to 45% by weight of a plasticizer.

Rotational molding is a process well known to a person skilled in the art. The various rotational molding processes all comprise the following stages: charging the mold, rotating the mold, heating the mold, cooling and removing from the mold. The mold is generally rotated around two perpendicular axes. The amount of powder and/or of microgranules to be molded introduced in the mold can be variable according to the size of the article which it is desired to obtain and the thickness of its walls.

The stage of heating the mold, also known as molding stage, takes place according to the invention in stage b). The heating temperature can vary from 150 to 230° C. For reasons of decomposition of the PLA, the use of a heating temperature of greater than 230° C. will be avoided. Use is generally made of a molding temperature at least 10° C. greater, preferably at least 20° C. greater and more preferably at least 30° C. greater, with respect to the melting point of the PLA which it is desired to mold. For the molding, use is preferably made of a temperature of between 160 and 225° C., more preferably between 180 and 220° C. The duration of the molding varies according to the dimensions and the thickness of the article to be rotationally molded; it can be between 5 and 300 minutes.

The duration and the cooling time depend on the plants of the rotational molding enterprise, on the dimensions of the article to be molded and on the type of article which is desired. As mentioned above, it is possible to cool the mold and/or the article present in the mold. In order to cool the mold externally, use may be made of air at ambient temperature, of water between 5 and 25° C. or of oil between 5 and 80° C. In order to cool the article inside the mold, air and/or sprayed water can be injected inside the mold, for example at 25° C. The cooling time generally varies between 1 and 300 minutes, depending on the thickness of the object to be rotationally molded and on the process used for the cooling.

According to one embodiment, the cooling of the mold and/or of the article obtained is carried out in just one stage down to a temperature of between ambient temperature and a temperature of less than 100° C. Such a cooling makes it possible to obtain a transparent and amorphous object which is characterized by a glass transition temperature of approximately 60° C., measured by DSC (differential scanning calorimetry) analysis.

According to another embodiment, the cooling of the mold and/or of the article comprises the following stages:
i) cooling down to a temperature of between 100° C. and 150° C.,
ii) maintaining at this temperature for 1 to 60 minutes,
iii) cooling down to a temperature of between ambient temperature and a temperature of less than 100° C.

According to this embodiment, the cooling is carried out gradually, by a stationary phase, the mold and/or the object being maintained at a temperature of between 100° C. and 150° C., preferably between 100° C. and 130° C., for from 1 to 60 minutes, before continuing the subsequent cooling of the mold and/or of the molded object down to a temperature of between ambient temperature and a temperature of less than 100° C. Such a cooling makes it possible to obtain a crystalline rotationally molded object which is characterized by a melting point. The object obtained by this process thus exhibits improved thermal resistance properties in comparison with the object resulting from the same rotational molding process but for which the cooling phase is rapid and takes place in just one stage.

Subsequently, the article is removed from the mold. The removal of the article from the mold is generally carried out when the article exhibits sufficient stiffness. If the molded object obtained is amorphous, the removal from the mold takes place at a temperature between ambient temperature and 60° C., preferably below 60° C., more preferably at 55° C. If the molded object obtained is crystalline, the removal from the mold generally takes place at a temperature of less than 100° C.

The rotational molding can be carried out under an inert gas in the absence of oxygen. To do this, it is possible, for example, to add, to the mold, with the PLA-based powder, a compound which releases carbon dioxide, such as dry ice. This is because the dry ice generates carbon dioxide in the gaseous state during the heating stage of the molding. It is also possible to carry out purging with nitrogen, by injecting nitrogen after closing the mold.

The present invention also relates to all uses of PLA in the form of powder and/or microgranules having the characteristics mentioned above for the manufacture of articles by rotational molding.

The present invention also relates to articles capable of being obtained by the process of the invention.

The article capable of being obtained by the process of the invention is characterized in that it is chosen from the group consisting of motor vehicle components, engineering components, furniture, design items and light fittings. Mention may be made, among motor vehicle components, for example, of body components or interior components, such as dashboards or handles.

The articles obtained by the rotational molding process according to the invention do not comprise a weak point. They exhibit uniform characteristics, such as, for example, an evenness in the thickness of the walls, and also a good internal and external surface appearance, without any runs, bubbles or other defects. The articles obtained also exhibit a good resistance to shrinkage. Furthermore, the articles obtained can be glossy and transparent, depending on the embodiment applied for the cooling stage. Finally, it should be noted that all these articles exhibit a high stiffness and that they can be very easily painted, due to their high surface tensions.

The articles obtained by rotational molding are generally weld-free hollow parts, such as, for example, articles chosen from the group consisting of tanks, tubs, flasks, cisterns, cases, boxes, vats, fenders and seats. These articles can comprise plastic or metal openings and/or inserts.

The walls of the articles can be composed of one or more successive layers, optionally different in nature. It is thus possible to manufacture, by this process, articles having walls comprising, for example, two or three layers. It is possible, for example, to produce articles exhibiting an internal and external PLA layer, similar or different in nature, optionally comprising antioxidants and/or heat stabilizers, fillers, impact modifiers, additives and adjuvants.

There exist several known methods for manufacturing, by rotational molding, articles having walls exhibiting several layers. It is possible, for example, to introduce a mixture of PLA and/or of polymers exhibiting different melting points and to mold at different temperatures, in order to obtain a multilayer structure. It is also possible to mold each additional layer before cooling the preceding layer.

EXAMPLES

Analytical Methods

1. Determination of the Optical Purity of the PLA

In the following examples, the determination of the optical or isomeric purity of the PLA is carried out by the enzymatic method.

The principle of the method is as follows: the L-lactate and D-lactate ions are oxidized to give pyruvate respectively by the enzymes L-lactate dehydrogenase and D-lactate dehydrogenase, using nicotinamide adenine dinucleotide (NAD) as coenzyme. In order to force the reaction in the direction of the formation of pyruvate, it is necessary to trap this compound by reaction with hydrazine. The increase in the optical density at 340 nm is proportional to the amount of L-lactate or D-lactate present in the sample.

The PLA samples were prepared by mixing 25 ml of sodium hydroxide (1 mol/l) with 0.6 g of PLA. The solution was brought to boiling point for 8 h and then cooled. The solution was subsequently brought to a neutral pH by addition of hydrochloric acid (1 mol/l) and then deionized water was added in an amount sufficient to arrive at 200 ml.

The samples were subsequently analyzed on a Vital Scientific Selectra Junior analyzer using, for the L-mer determination of the poly-L-lactide acid, the pack entitled "L-lactic acid 5260" sold by Scil and, for the D-mer determination of the poly-D-lactide acid, the pack entitled "L-lactic acid 5240" sold by Scil. During the analysis, a reactive blank and a calibration using the calibrating agent "Scil 5460" are used.

2. Determination of the Molecular Weight of the PLA

In the following examples, the molecular weights are measured at 30° C. using a Waters 610 liquid chromatograph: a solution of polymer in chloroform with a concentration of 1 mg of polymer/ml is first prepared. 100 µl of this solution are withdrawn and injected, through a filter having a pore diameter of 0.2 µm, into the column of the chromatograph at 30° C. The molecular weights are determined on the basis of the retention time in the column, of a calibration carried out with polystyrene samples and of a universal calibration curve.

3. Determination of the Shrinkage of the Molded Object

The shrinkage of the molded object with respect to the impression of the mold is measured by three-dimensional analysis according to the method described in the published International patent application WO 2008/151988. The mean measured shrinkage on the molded object is expressed in % with respect to the internal volume of the mold.

4. Determination of the Appearance of the Walls of the Molded Object

The appearance of the walls, uniformity, presence of bubbles and/or of runs, is determined visually.

5. Determination of the Evenness of the Thickness of the Walls of the Molded Object The evenness of the thickness of the walls is determined by tomography, a technique well known to a person skilled in the art.

6. Determination of the Mechanical Properties

The modulus of rigidity is determined by the ASTM D-638 method.

7. Determination of the Surface Tension

It is a matter of measuring, using a goniometer, the contact angles made by drops of standard liquids deposited at the surface to be analyzed. The equipment and the operating conditions are as follows:

Krüss DSA 100 goniometer,
Software for making use of the data: DropShape analysis,
Standard liquids: diiodomethane, water, ethylene glycol,
8 to 10 drops per standard liquid,
Temperature: 23° C.,
Relative humidity: 50%.

Resins Used

In the examples according to the invention, the resins identified below were used:

Poly-L-lactide powder, obtained after grinding granules of PLLA having an optical purity of 98.5% by weight and a number-average molecular weight of approximately 100 000 (PS equivalent). The mean size of the particles of the powder after grinding is 300 µm.

Poly-L-lactide powder, obtained after grinding granules of PLA 8300, sold by NatureWorks, having an optical purity of 88% by weight and a number-average molecular weight of 111 000 (PS equivalent). The mean size of the particles of the powder after grinding is 300 µm.

In the comparative examples, the resins identified below were used:

Polyethylene powder, obtained after grinding granules of polyethylene having a density of 0.940 g/cm$^3$ and a melt flow index of 4 g/10 min (ASTM D-1238 conditions 2.16 kg/190° C.). The mean size of the particles of the powder after grinding is 300 µm.

Polypropylene powder, obtained after grinding granules of a polypropylene copolymer characterized by a melt flow index of 2 (ASTM D-1238 conditions 2.16 kg/190° C.). The mean size of the particles of the powder after grinding is 800 µm.

Manufacture of Articles by Rotational Molding

Examples 1 to 4

The different resins in the form of powder as mentioned above are used separately to form bottles by rotational molding. The rotational molding parameters are as follows:

7-liter bottle mold on a Leonardo machine
Heating the mold from 50 to 225° C. in 3 minutes
PIAT (peak internal air temperature): 225° C.
Rotational ratio: 4/1
Cooling the mold from 225 to 50° C. in 1 minute with oil maintained in a jacket at a temperature of less than 40° C.
Removal from the mold at 50° C.

The internal and external surface appearance of the walls, the evenness of the thickness of the walls, the degree of shrinkage of the molded object with respect to the mold, the modulus of rigidity and the surface tension are determined on the articles obtained. The results are presented in table 1.

TABLE 1

| Example | Resin | Degree of shrinkage % | Young's modulus MPa | Surface tension mJ/m$^2$ |
|---|---|---|---|---|
| 1 (invention) | PLLA | 0 | 3200 | >42 |
| 2 (invention) | PLLA 8300 | n.m. | n.m. | n.m. |
| 3 (comparative) | PE | 7.5 | 800 | <35 |
| 4 (comparative) | PP | 4 | 1100 | <35 | n.m.: not measured

The object molded according to the process of the invention with a PLA resin having an optical purity of 98.5% by weight (example 1) exhibits an evenness with regard to the thickness of the walls and also a good internal and external surface appearance without any runs, bubbles or other defects. The rotationally molded object of example 2 exhibits a poorer evenness with regard to the thickness of the walls and a poorer internal and external surface appearance than that of example 1. This object does not meet with all the desired properties.

Example 5

The powder formed of poly-L-lactide having an optical purity of 98.5% by weight as described above was used to form bottles by rotational molding. The rotational molding parameters are as follows:
  7-liter bottle mold on a Leonardo machine
  Heating the mold from 50 to 225° C. in 3 minutes
  PIAT: 215° C.
  Rotational ratio: 4/1
  Cooling the mold down to 110° C.
  Maintaining the mold at 110° C. for 9 minutes
  Cooling to 70° C. and removing from the mold at 70° C.

The rotationally molded object obtained is crystalline and is characterized by a Young's modulus of 3200 MPa, a surface tension of greater than 42 mJ/m$^2$, the absence of deformation (degree of shrinkage of 0%), an evenness with regard to the thickness of the walls and also a good internal and external surface appearance, without any runs, bubbles or other defects.

Example 6 (Invention) and Example 7 (Comparative)

The powder formed of poly-L-lactide having an optical purity of 98.5% by weight as described above and the polyethylene powder as described above were used separately to form 7-liter bottles by rotational molding on a Leonardo machine. The temperature of the air was measured in the mold during the rotational molding of the poly-L-lactide and of the polyethylene. This temperature is illustrated in FIG. 1 as a function of the time for each of the two resins.

Surprisingly, the coalescence of the PLA is markedly faster than that of the polyethylene (PE), whereas the melting point of the PLA (+/−170° C.) is higher than that of the PE (+/−140° C.). Moreover, the cooling time of the PLA is also faster than that of the PE. These savings in time will make possible faster production cycles by rotational molding using PLA in comparison with PE.

The invention claimed is:

1. A process for the manufacture of a polylactide-based article by rotational molding, comprising:
   a) placing polylactide in a mold,
   b) subjecting the polylactide to a rotational molding comprising heating to a temperature of between 150° C. and 230° C. to obtain the article,
   c) cooling the mold or the article obtained, and
   d) removing the article from the mold,
   wherein the optical purity of the polylactide is greater than 92% by weight;
   wherein the polylactide is in the form of particles having a size of between 20 μm and 2000 μm;
wherein the cooling of the mold or of the article obtained in stage (c) comprises the following stages:
   i) cooling down to a temperature of between 100° C. and 150° C.,
   ii) maintaining at this temperature for 1 to 60 minutes,
   iii) cooling down to a temperature of between ambient temperature and a temperature of less than 100° C.

2. The process as claimed in claim 1, wherein the cooling in stage (i) takes place down to a temperature of between 100° C. and 130° C.

3. The process as claimed in claim 1, wherein stage (ii) takes place for 1 to 30 minutes.

4. An article obtained by the process as claimed in claim 1.

5. The article as claimed in claim 1, wherein the article is selected from the group consisting of motor vehicle components, engineering components, furniture, design items and light fittings.

* * * * *